US012124736B2

(12) United States Patent
Jiang et al.

(10) Patent No.: US 12,124,736 B2
(45) Date of Patent: Oct. 22, 2024

(54) IN-MEMORY COMPUTING MODULE AND METHOD, AND IN-MEMORY COMPUTING NETWORK AND CONSTRUCTION METHOD THEREFOR

(71) Applicant: XI'AN UNIIC SEMICONDUCTORS CO., LTD., Xi'an (CN)

(72) Inventors: Xiping Jiang, Xi'an (CN); Xiaofeng Zhou, Xi'an (CN); Fengguo Zuo, Xi'an (CN)

(73) Assignee: XI'AN UNIIC SEMICONDUCTORS CO., LTD., Xi'an (CN)

( * ) Notice: Subject to any disclaimer, the term of this patent is extended or adjusted under 35 U.S.C. 154(b) by 64 days.

(21) Appl. No.: 18/013,052

(22) PCT Filed: Jan. 26, 2021

(86) PCT No.: PCT/CN2021/073751
§ 371 (c)(1),
(2) Date: Dec. 27, 2022

(87) PCT Pub. No.: WO2022/021821
PCT Pub. Date: Feb. 3, 2022

(65) Prior Publication Data
US 2023/0244415 A1 Aug. 3, 2023

(30) Foreign Application Priority Data
Jul. 30, 2020 (CN) .......................... 202010754206.9

(51) Int. Cl.
*G06F 3/06* (2006.01)
(52) U.S. Cl.
CPC .......... *G06F 3/0658* (2013.01); *G06F 3/0622* (2013.01); *G06F 3/067* (2013.01)
(58) Field of Classification Search
CPC ....... G06F 3/0658; G06F 3/0622; G06F 3/067
See application file for complete search history.

(56) References Cited

U.S. PATENT DOCUMENTS 9,432,298 B1 * 8/2016 Smith ................. H04L 49/9057
2016/0041856 A1 * 2/2016 Sankaralingam ... G06F 15/7821
719/330
(Continued)

FOREIGN PATENT DOCUMENTS

CN 101145147 A 3/2008
CN 111159094 A 4/2016
(Continued)

OTHER PUBLICATIONS

A dictionary.com defintion of the term "further" captured by archive. org on Mar. 16, 2016 (Year: 2016).*
(Continued)

*Primary Examiner* — Tim T Vo
*Assistant Examiner* — Janice M. Girouard
(74) *Attorney, Agent, or Firm* — Christopher L. Bernard; Clements Bernard Walker

(57) ABSTRACT

The present application relates to an in-memory computing module and method, and an in-memory computing network and a construction method therefor. The in-memory computing module comprises at least two computing submodules, and low latency can be achieved when computing units in the computing submodules access memory units. Multiple computing submodules present a symmetric layer design, and such a symmetric layer structure facilitates the construction of a topology network so as to achieve large-scale or ultra-large-scale computation. The memory capacity of the memory units in each computing submodule can be customized, and designed flexibly. These computing submodules are in a bonding connection, and the data bit width after the bonding connection may be positive integer multiple of the data bit width of the computing units, so that high data bandwidth is achieved. The in-memory computing network (Continued)

uses the in-memory computing module, so that the requirements for different scales of computation can be satisfied.

19 Claims, 5 Drawing Sheets

(56) References Cited

U.S. PATENT DOCUMENTS

2019/0319626 A1* 10/2019 Dabral ................ H01L 25/0652
2019/0370269 A1    12/2019 Bogdan et al.

FOREIGN PATENT DOCUMENTS

| CN | 105468569 A | 8/2019 |
| CN | 110192269 A | 8/2019 |

OTHER PUBLICATIONS

He, Huaxin, "Research on Dynamic Resources Sharing in Three Dimensional Processors," Jan. 31, 2015, ISSN: 1674-0248, pp. 19-24.
May 8, 2021, International Search Report for International Application No. PCT/CN2021/073751.

* cited by examiner

IN-MEMORY COMPUTING MODULE AND METHOD, AND IN-MEMORY COMPUTING NETWORK AND CONSTRUCTION METHOD THEREFOR

CROSS-REFERENCE TO RELATED APPLICATIONS

This application is a National Stage Entry Application of PCT Patent Application No. PCT/CN2021/073751, having an International filing date of Jan. 26, 2021, which claims priority to CN202010754206.9 filed on Jul. 30, 2020, the contents of which are incorporated by reference in their entirety.

TECHNICAL FIELD

The present application relates to the field of memory. In particular, the present application relates to an in-memory computing module and method, and an in-memory computing network and a construction method therefor.

BACKGROUND ART

In the prior art, processor manufacturers and memory manufacturers are separated from each other, which causes the development of memory technology and the development of processor technology to be out of sync. Processor performance improves rapidly, while memory performance improves relatively slowly. The unbalanced developments of processor performance and memory performance have caused the memory access speed to severely lag behind the processor's computing speed. The memory bottleneck makes it difficult for high-performance processors to play well. This poses a great constraint on the ever-increasing high-performance computing. This phenomenon in which memory performance severely limits processor performance is known as the "Memory Wall".

With the continuous and rapid growth of computing capacity of central processing unit (CPU) and application computing scale, the problem of "Memory Wall" has become more and more prominent.

In order to solve the problem of "Memory Wall", the concept of "in-memory computing" or "integration of memory and computing" emerged.

Traditional computing units and memory units are separate, i.e. they are not in the same chip. Therefore, during the traditional computation, a computing unit needs to retrieve data from a memory unit, and then write the data back to the memory unit after processing is completed. The "in-memory computing" is to combine a memory unit and a computing unit, and shorten the data transmission path by making the memory unit as close as possible to the computing unit, thereby reducing the data access latency. Meanwhile, "in-memory computing" manages to increase access bandwidth, thereby effectively improving computing performance.

An "in-memory computing" structure known in the prior art is shown in FIG. 1. In this "in-memory computing" structure, the memory unit is Resistive Random Access Memory (RRAM), and the computing unit is Neural-Network Process Unit (NPU), Since RRAM and NPU use an integrated structure, NPU has low access latency. Nonetheless, for RRAM, the process technology is not yet mature, and the structure design has no expansibility, so it is difficult for RRAM to satisfy higher performance computing requirements.

In the prior art, there is also a 3D stacking technology using Through Silicon Via (TSV) technology to implement an "in-memory computing" structure. The 3D stacking technology is to stack multiple wafers together and interconnect different wafers by using TSV technology. This is a three-dimensional multi-layer stacking technology that enables communication of multiple wafers in a vertical direction by TSV. Nonetheless, in the 3D stacking technology; there are many technical difficulties. For example, the filling technology for deep holes in TSV is a technical difficulty, because the filling effect of the deep holes in TSV is directly related to the reliability and yield of the 3D stacking technology, which is crucial for integration and practicality of the 3D stacking technology. For another example, TSV technology needs to maintain good integrity during the thinning process of a substrate so as to avoid crack propagation.

Therefore, there is an urgent need to solve the above-mentioned technical problems in the prior art.

SUMMARY OF THE INVENTION

The present application relates to an in-memory computing module and method, an in-memory computing network and a construction method therefor. The in-memory computing module comprises a plurality of computing submodules, and low latency can be achieved when computing units in each computing submodule access memory units. The plurality of computing submodules present a layer-symmetric design, and such a layer-symmetric structure facilitates the construction of a topology network so as to achieve large-scale or ultra-large-scale computation. The storage capacity of memory units in each computing submodule can be customized, and designed more flexibly. The plurality of computing submodules are connected to each other by means of bonding connection, and data bit width in the case of bonding connection can be a positive integer multiple of data bit width of the computing unit, so that higher data bandwidth is achieved. The in-memory computing network utilizes the in-memory computing module and thus can satisfy the requirements for different scales of computation.

According to a first aspect of the present application, there is provided an in-memory computing module, comprising:
  at least two computing submodules, wherein the at least two computing submodules are stacked in sequence in one direction, wherein each computing submodule is connected to its adjacent computing submodule, and wherein each computing submodule comprises at least one computing unit and a plurality of memory units;
  wherein the at least two computing sub modules are located in the same chip.

Therefore, the in-memory computing module comprising a plurality of computing submodules can achieve large-scale computation in the same one chip, and low latency can be achieved when computing units access memory units, thereby improving computing performance.

According to a preferred embodiment of the in-memory computing module of the present application, each computing submodule comprises:
  a computing unit;
  a plurality of memory units;
  a routing unit, wherein the routing unit is connected to the computing unit, wherein the routing unit is connected to each of the plurality of memory units, wherein the routing unit is connected to a routing unit of at least one further computing sub module of the in-memory computing module where the routing unit is located, and wherein the routing unit is connected to a routing unit of at least one further computing submodule of at least one further in-memory computing module;

wherein the routing unit is configured to perform access of a first computing unit of the computing submodule where the routing unit is located to a first memory unit of the computing submodule where the routing unit is located, access to a second computing unit or a second memory unit of at least one further computing submodule of the in-memory computing sub module where the routing unit is located, or access to a third computing unit or a third memory unit of at least one further computing submodule of at least one further in-memory computing module.

According to a preferred embodiment of the in-memory computing module of the present application, the routing unit comprises:

a routing interface, which connects the routing unit to a routing unit of at least one further computing submodule of the in-memory computing module where the routing unit is located, and/or which connects the routing unit to a routing unit of at least one further computing submodule of at least one further in-memory computing module;

a memory control interface, which connects the routing unit to each of the plurality of memory units.

According to a preferred embodiment of the in-memory computing module of the present application, the routing unit further comprises:

a crossbar switch unit;

a switching routing computing unit, wherein the switching routing computing unit is connected to the routing interface and the crossbar switch unit, wherein the switching routing computing unit stores at least routing information about the in-memory computing module where the routing unit is located and about the computing unit of the computing submodule where the routing unit is located, and wherein the switching routing computing unit parses a received data access request and controls switching of the crossbar switch unit based on parsed data access request;

a memory control unit, wherein the memory control unit is connected to the crossbar switch unit and the memory control interface, wherein the memory control unit stores at least routing information about the plurality of memory units, and wherein the memory control unit, in response to switching of the crossbar switch unit to the memory control unit, performs secondary parse of the parsed data access request received from the crossbar switch unit to determine a destination memory unit, and accesses the destination memory unit via the memory control interface.

According to a preferred embodiment of the in-memory computing module of the present application, the computing unit accesses at least one memory unit directly via the routing unit. That is, the routing unit parses the data access request issued by the computing unit, acquires access data from the at least one memory unit directly, and forwards the access data to the computing unit that issued the data access request, wherein the data access request includes at least an address of the at least one memory unit.

According to a preferred embodiment of the in-memory computing module of the present application, the computing unit accesses at least one further memory unit indirectly via the routing unit. That is, the routing unit parses the data access request issued by the computing unit, forwards the parsed data access request to a routing unit of at least one further computing sub module and forwards to a further computing unit connected to the routing unit of the at least one further computing submodule, acquires access data from at least one further memory unit indirectly via the further computing unit, and forwards the access data to the computing unit that issued the data access request, wherein the data access request includes at least an address of the at least one further memory unit, wherein the further computing unit can access the at least one further memory unit directly via the routing unit.

Thus, by means of the routing unit, the overall distribution of the access requests of the computing unit to the memory unit is realized and the memory control function is realized, which can achieve further low latency when the computing unit accesses the memory unit. Furthermore, the intercommunication between the computing submodules can be realized by means of the routing unit.

According to a preferred embodiment of the in-memory computing module of the present application, the routing unit is connected, by a bonding connection, to a routing unit of at least one further computing sub module of the in-memory computing module where the routing unit is located.

As a result, a plurality of computing sub modules can be connected to each other by mature bonding connection methods to achieve the required electrical performance.

According to a preferred embodiment of the in-memory computing module of the present application, total data bit width of connection between the routing unit and a routing unit of at least one further computing submodule of the in-memory computing module where the routing unit is located is n multiple of data bit width of the computing unit, where n is a positive integer.

Thus, by setting the relationship between the data bit width of the connection between the routing units and the data bit width of a single computing unit, a higher data bandwidth can be achieved.

According to a preferred embodiment of the in-memory computing module of the present application, the number of the plurality of memory units is determined at least according to data bit width of the computing unit and data bit width of a single memory unit.

Since the number of memory units can be selected according to requirements, the design is more flexible.

According to a preferred embodiment of the in-memory computing module of the present application, in each of the computing submodules, positions of the computing unit, the plurality of memory units and the routing unit in a respective computing submodule are the same.

According to a preferred embodiment of the in-memory computing module of the present application, in each of the computing submodules, the computing unit and the routing unit are located at the center of the respective computing submodule, and the plurality of memory units are distributed around the computing unit and the routing unit in the respective computing submodule.

According to a preferred embodiment of the in-memory computing module of the present application, each of the at least two computing sub modules are the same as each other.

Therefore, the plurality of computing submodules present a layer-symmetric design, and such a layer-symmetric structure facilitates the constructions of a topology network so as to achieve large-scale or ultra-large-scale computation.

According to a preferred embodiment of the in-memory computing module of the present application, each of the computing sub modules comprises:
at least two computing units;
a plurality of memory units;

at least two routing units, each of the routing units is connected to at least one computing unit, and each of the routing units is connected to at least one memory unit;

wherein the at least two routing units are connected to each other to form an overall routing unit, wherein the overall routing unit is connected to each of the plurality of memory units, wherein the overall routing unit is connected to an overall routing unit of at least one further computing submodule of the in-memory computing module where the overall routing unit is located, and wherein the overall routing unit is connected to an overall routing unit of at least one further computing sub module of at least one further in-memory computing module;

wherein the overall routing unit is configured to perform access of a first computing unit of the computing submodule where the overall routing unit is located to a first memory unit or a second computing unit of the computing submodule where the overall routing unit is located, access to a second memory unit or a third computing unit of at least one further computing submodule of the in-memory computing module where the overall routing unit is located, or access to a third memory unit or a fourth computing unit of at least one further computing submodule of at least one further in-memory computing module.

According to a preferred embodiment of the in-memory computing module of the present application, each of the at least two routing units comprises:

a routing interface, which connects the routing unit to at least one further routing unit of the computing submodule where the routing unit is located, and/or which connects the routing unit to a routing unit of at least one further computing submodule of the in-memory computing module where the routing unit is located, and/or which connects the routing unit to a routing unit of at least one further computing submodule of at least one further in-memory computing module;

a memory control interface, which connects the routing unit to at least one of the plurality of memory units.

According to a preferred embodiment of the in-memory computing module of the present application, each of the at least two routing units further comprises:

a crossbar switch unit;

a switching routing computing unit, wherein the switching routing computing unit is connected to the routing interface and the crossbar switch unit, wherein the switching routing computing unit stores at least routing information about the in-memory computing module where the routing unit is located and about at least one computing unit of the computing submodule where the routing unit is located, wherein the switching routing computing unit parses a received data access request and controls switching of the crossbar switch unit based on parsed data access request;

a memory control unit, wherein the memory control unit is connected to the crossbar switch unit and the memory control interface, wherein the memory control unit stores at least routing information about at least one of the plurality of memory units, wherein the memory control unit, in response to switching of the crossbar switch unit to the memory control unit, performs secondary parse of the parsed data access request received from the crossbar switch unit to determine a destination memory unit, and accesses the destination memory unit via the memory control interface.

According to a preferred embodiment of the in-memory computing module of the present application, each computing unit accesses at least one memory unit directly via the overall routing unit. That is, the overall routing unit parses the data access request issued by the computing unit, acquires the access data directly from the at least one memory unit, and forwards the access data to the computing unit that issued the data access request, wherein the data access request includes at least an address of the at least one memory unit.

According to a preferred embodiment of the in-memory computing module of the present application, each computing unit accesses at least one further memory unit indirectly via the overall routing unit. That is, the overall routing unit parses the data access request issued by the computing unit, forwards the parsed data access request to the overall routing unit of at least one further computing sub module and forwards to a further computing unit connected to the overall routing unit of the at least one further computing submodule, acquires access data indirectly from at least one further memory unit via the further computing unit, and forwards the access data to the computing unit that issued the data access request, wherein the data access request includes at least an address of the at least one further memory unit, wherein the further computing unit can access the at least one further memory unit directly via the overall routing unit.

According to a preferred embodiment of the in-memory computing module of the present application, the overall routing unit is connected, by a bonding connection, to an overall routing unit of at least one further computing submodule of the in-memory computing module where the overall routing unit is located.

According to a preferred embodiment of the in-memory computing module of the present application, total data bit width of connection between the overall routing unit and an overall routing unit of at least one further computing submodule of the in-memory computing module where the overall routing unit is located is n multiple of data bit width of the computing unit, wherein n is a positive integer.

According to a preferred embodiment of the in-memory computing module of the present application, the number of the plurality of memory units is determined at least according to data bit width of the at least two computing units and data bit width of a single memory unit.

According to a preferred embodiment of the in-memory computing module of the present application, in each computing sub module, positions of the at least two computing units, the plurality of memory units and the overall routing unit in a respective computing sub module are the same.

According to a preferred embodiment of the in-memory computing module of the present application, in each computing submodule, the at least two computing units and the overall routing unit are located at the center of a respective computing submodule, and the plurality of memory units are distributed around the at least two computing units and the overall routing unit in the respective computing submodule.

According to a preferred embodiment of the in-memory computing module of the present application, each of the at least two computing sub modules are the same as each other.

According to a preferred embodiment of the in-memory computing module of the present application, the memory unit includes a dynamic random access memory, and the computing unit includes a central processing unit.

Since the technology of dynamic random access memory is relatively mature, such memory is preferably used in the present application.

According to a preferred embodiment of the in-memory computing module of the present application, the at least two computing sub modules are two computing sub modules.

According to a preferred embodiment of the in-memory computing module of the present application, the storage capacity of the memory unit is customizable.

As the storage capacity of the memory unit can be customized, the design flexibility is further enhanced.

According to a second aspect of the present application, there is provided an in-memory computing method, which is used for the above-mentioned in-memory computing module (in the in-memory computing module, one computing submodule has one routing unit), the in-memory computing method comprising the following steps carried out by a routing unit:

receiving a data access request, wherein the data access request is issued by a first computing unit and includes at least an address of a destination memory unit; and, parsing the data access request, acquiring access data from the destination memory unit, and forwarding the access data to the first computing unit.

In this technical solution, if the destination memory unit and the first computing unit are located in the same in-memory computing module, the "routing unit" refers to the routing unit in said in-memory computing module; and, if the destination memory unit and the first computing unit are not located in the same in-memory computing module, the "routing unit" refers to all routing units required for communication between the first computing unit and the destination memory unit.

According to an embodiment of the in-memory computing method of the present application, the in-memory computing method further comprises the following steps carried out by the routing unit connected to the first computing unit:

after the routing unit parses the data access request and before the routing unit acquires access data from the destination memory unit, judging whether the first computing unit can access the destination memory unit directly via the routing unit connected to the first computing unit;

under the condition that the first computing unit can access the destination memory unit directly via the routing unit connected to the first computing unit, acquiring access data directly from the destination memory unit and forwarding the access data to the first computing unit; and under the condition that the first computing unit cannot access the destination memory unit directly via the routing unit connected to the first computing unit, forwarding parsed data access request to a second computing unit, and acquiring access data from the destination memory unit via the second computing unit and forwarding the access data to the first computing unit.

According to an embodiment of the in-memory computing method of the present application, the in-memory computing method further comprises the following steps carried out by the routing unit connected to the first computing unit:

under the condition that the first computing unit cannot access the destination memory unit directly via the routing unit connected to the first computing unit and before the routing unit connected to the first computing unit forwards the parsed data access request to a second computing unit, judging whether the destination memory unit and the first computing unit are located in the same in-memory computing module;

under the condition that the destination memory unit and the first computing unit are located in the same in-memory computing module, forwarding the parsed data access request to a routing unit of a further computing submodule connected to the routing unit connected to the first computing unit, and forwarding to a second computing unit connected to the routing unit of the further computing submodule, and acquiring access data from the destination memory unit via the second computing unit and forwarding the access data to the first computing unit, wherein the second computing unit can access the destination memory unit directly via the routing unit of the further computing sub module:

under the condition that the destination memory unit and the first computing unit are not located in the same in-memory computing module, forwarding the parsed data access request to a routing unit of a further computing submodule of a further in-memory computing module connected to the routing unit connected to the first computing unit, and forwarding to a second computing unit connected to the routing unit of the further computing submodule of the further in-memory computing module, and acquiring access data from the destination memory unit via the second computing unit and forwarding the access data to the first computing unit, wherein the second computing unit can access the destination memory unit directly via the routing unit of the further computing submodule of the further in-memory computing module.

According to a third aspect of the present application, there is provided an in-memory computing method, which is used for the above-mentioned in-memory computing module ((in the in-memory computing module, one computing submodule has one routing unit), the in-memory computing method comprising the following steps carried out by a routing unit:

receiving a data access request, wherein the data access request is issued by a first computing unit and includes at least an address of a destination memory unit; and, parsing the data access request, acquiring access data from the destination memory unit, and forwarding the access data to the first computing unit.

In this technical solution, if the destination computing unit and the first computing unit are located in the same in-memory computing module, the "routing unit" refers to the routing unit in the in-memory computing module; and, if the destination computing unit and the first computing unit are not located in the same in-memory computing module, the "routing unit" refers to all routing units required for communication between the first computing unit and the destination computing unit.

According to an embodiment of the in-memory computing method of the present application, the in-memory computing method further comprises the following steps carried out by a routing unit connected to the first computing unit:

after the routing unit parses the data access request and before the routing unit acquires access data from the destination computing unit, judging whether the destination computing unit and the first computing unit are located in the same in-memory computing module;

under the condition that the destination computing unit and the first computing unit are located in the same in-memory computing module, forwarding parsed data access request to a routing unit of a further computing submodule connected to the routing unit connected to the first computing unit, and acquiring access data from the destination computing unit via the routing unit of the further computing submodule and forwarding the access data to the first computing unit;

under the condition that the destination computing unit and the first computing unit are not located in the same in-memory computing module, forwarding the parsed data access request to a routing unit of a further computing submodule of a further in-memory computing module connected to the routing unit connected to the first computing unit, and acquiring access data from the destination computing unit via the routing unit of the further computing submodule of the further in-memory computing module and forwarding the access data to the first computing unit.

According to a fourth aspect of the present application, there is provided an in-memory computing method, which is used for the above- mentioned in- memory computing module (in the in-memory computing module, one computing submodule has at least two routing units), the in-memory computing method comprising the following steps carried out by an overall routing unit:

receiving a data access request, wherein the data access request is issued by a first computing unit and includes at least an address of a destination memory unit; and, parsing the data access request, acquiring access data from the destination memory unit, and forwarding the access data to the first computing unit.

In this technical solution, if the destination memory unit and the first computing unit are located in the same in-memory computing module, the "overall routing unit" refers to the overall routing unit in the in-memory computing module; and, if the destination memory unit and the first computing unit are not located in the same in-memory computing module, the "overall routing unit" refers to all overall routing units required for communication between the first computing unit and the destination memory unit.

According to an embodiment of the in-memory computing method of the present application, the in-memory computing method further comprises the following steps carried out by the overall routing unit connected to the first computing unit:

after the overall routing unit parses the data access request and before the overall routing unit acquires the access data. from the destination memory unit, judging whether the first computing unit can access the destination memory unit directly via the overall routing unit connected to the first computing unit;

under the condition that the first computing unit can access the destination memory unit directly via the overall routing unit connected to the first computing unit, acquiring access data directly from the destination memory unit and forwarding the access data to the first computing unit; and under the condition that the first computing unit cannot access the destination memory unit directly via the overall routing unit connected to the first computing unit, forwarding parsed data access request to a second computing unit, and acquiring access data from the destination memory unit via the second computing unit and forwarding the access data to the first computing unit.

According to an embodiment of the in-memory computing method of the present application, the in-memory computing method further comprises the following steps carried out by the overall routing unit connected to the first computing unit:

under the condition that the first computing unit cannot access the destination memory unit directly via the overall routing unit connected to the first computing unit and before the overall routing unit connected to the first computing unit forwards the parsed data access request to a second computing unit, judging whether the destination memory unit and the first computing unit are located in the same in-memory computing module;

under the condition that the destination memory unit and the first computing unit are located in the same in-memory computing module, forwarding the parsed data access request to an overall routing unit of a further computing submodule connected to the overall routing unit connected to the first computing unit, and forwarding to a second computing unit connected to the overall routing unit of the further computing submodule, and acquiring access data from the destination memory unit via the second computing unit and forwarding the access data to the first computing unit, wherein the second computing unit can access the destination memory unit directly via the overall routing unit of the further computing submodule;

under the condition that the destination memory unit and the first computing unit are not located in the same in-memory computing module, forwarding the parsed data access request to an overall routing unit of a further computing submodule of a further in-memory computing module connected to the overall routing unit connected to the first computing unit, and forwarding to a second computing unit connected to the overall routing unit of the further computing submodule of the further in-memory computing module, and acquiring access data from the destination memory unit via the second computing unit and forwarding the access data to the first computing unit, wherein the second computing unit can access the destination memory unit directly via the overall routing unit of the further computing submodule of the further in-memory computing module.

According to a fifth aspect of the present application, there is provided an in-memory computing method, which is used for the above-mentioned in-memory computing module (in the in-memory computing module, one computing submodule has at least two routing units), the in-memory computing method comprising the following steps carried out by an overall routing unit:

receiving a data access request, wherein the data access request is issued by a first computing unit and includes at least an address of a destination computing unit; and, parsing the data access request, acquiring access data from the destination computing unit, and forwarding the access data to the first computing unit.

In this technical solution, if the destination computing unit and the first computing unit are located in the same in-memory computing module, the "overall routing unit" refers to the overall routing unit in the in-memory computing module; and, if the destination computing unit and the first computing unit are not located in the same in-memory computing module, the "overall routing unit" refers to all overall routing units required for communication between the first computing unit and the destination computing unit.

According to an embodiment of the in-memory computing method of the present application, the in-memory computing method further comprises the following steps carried out by the overall routing unit connected to the first computing unit:

after the overall routing unit parses the data access request and before the overall routing unit acquires access data from the destination computing unit, judging whether the destination computing unit and the first computing unit are located in the same in-memory computing module;

under the condition that the destination memory unit and the first computing unit are located in the same in-memory computing module, forwarding parsed data access request to an overall routing unit of a further computing submodule connected to the overall routing unit connected to the first computing unit, and acquiring access data from the destination computing unit via the overall routing unit of the further computing submodule and forwarding the access data to the first computing unit;

under the condition that the destination computing unit and the first computing unit are not located in the same in-memory computing module, forwarding the parsed data access request to an overall routing unit of a further in-memory computing module connected to the overall routing unit connected to the first computing unit, and acquiring access data from the destination computing unit via the overall routing unit of the further in-memory computing module and forwarding the access data to the first computing unit.

According to a sixth aspect of the present application, there is provided an in-memory computing network, comprising:

a plurality of in-memory computing modules, which are a plurality of in-memory computing modules mentioned above, and are connected to each other via the routing units thereof.

According to a preferred embodiment of the in-memory computing network of the present application, the plurality of in-memory computing modules are connected into bus, star, ring, tree, mesh and hybrid topologies.

According to a preferred embodiment of the in-memory computing network of the present application, the plurality of in-memory computing modules are connected to each other via routing units by metal wires.

According to a seventh aspect of the present application, there is provided a construction method of an in-memory computing module, comprising:

stacking at least two computing submodules in sequence in one direction;

connecting each computing submodule to its adjacent computing submodule, wherein each computing submodule comprises at least one computing unit and a plurality of memory units;

wherein the at least two computing sub modules are arranged in the same chip.

According to a preferred embodiment of the construction method of the present application, each computing submodule comprises a. computing unit, a plurality of memory units, and a routing unit; wherein the construction method further comprises:

connecting the routing unit to the computing unit; connecting the routing unit to each of the plurality of memory units; connecting the routing unit to a routing unit of at least one further computing submodule of the in-memory computing module where the routing unit is located, and connecting the routing unit to a routing unit of at least one further computing submodule of at least one further in-memory computing module; and configuring the routing unit to perform access of a first computing unit of the computing submodule where the routing unit is located to a first memory unit of the computing submodule where the routing unit is located, access to a second computing unit or a second memory unit of at least one further computing submodule of the in-memory computing submodule where the routing unit is located, or access to a third computing unit or a third memory unit of at least one further computing submodule of at least one further in-memory computing module.

According to a preferred embodiment of the construction method of the present application, the construction method further comprises:

connecting routing interface of the routing unit to a routing unit of at least one further computing submodule of the in-memory computing module where the routing unit is located, and/or connecting the routing interface of the routing unit to a routing unit of at least one further computing submodule of at least one further in-memory computing module;

connecting memory control interface of the routing unit to each of the plurality of memory units.

According to a preferred embodiment of the construction method of the present application, the construction method further comprises:

connecting switching routing computing unit of the routing unit to the routing interface and a crossbar switch unit; storing, in the switching routing computing, unit, at least routing information about the in-memory computing module where the routing unit is located and about the computing unit of the computing submodule where the routing unit is located, and configuring the switching routing computing unit to parse a received data access request and control the switching of the crossbar switch unit based on the parsed data access request;

connecting the memory control unit of the routing unit to the crossbar switch unit and the memory control interface; storing at least routing information about the plurality of memory units in the memory control unit, and configuring the memory control unit, in response to switching of the crossbar switch unit to the memory control unit, to perform secondary parse of the parsed data access request received from the crossbar switch unit to determine a destination memory unit, and to access the destination memory unit via the memory control interface.

According to a preferred embodiment of the construction method of the present application, the construction method further comprises: configuring the computing unit to access at least one memory unit directly via the routing unit. That is, the routing unit parses the data access request issued by the computing unit, acquires access data from the at least one memory unit directly, and forwards the access data to the computing unit that issued the data access request, wherein the data access request includes at least an address of the at least one memory unit.

According to a preferred embodiment of the construction method of the present application, the construction method further comprises: configuring the computing unit to access at least one further memory unit indirectly via the routing unit. That is, the routing unit parses the data access request issued by the computing unit, forwards the parsed data access request to a routing unit of at least one further computing sub module and forwards to a further computing unit connected to the routing unit of the at least one further computing submodule, acquires access data from at least one further memory unit indirectly via the further computing unit, and forwards the access data to the computing unit that issued the data access request, wherein the data access request includes at least an address of the at least one further memory unit, wherein the further computing unit can access the at least one further memory unit directly via the routing unit.

According to a preferred embodiment of the construction method of the present application, the construction method further comprises:

connecting the routing unit, by a bonding connection, to a routing unit of at least one further computing submodule of the in-memory computing module where the routing unit is located.

According to a preferred embodiment of the construction method of the present application, the construction method further comprises:

setting total data bit width of connection between the routing unit and the routing unit of at least one further computing submodule of the in-memory computing module where the routing unit is located to be n multiple of data bit width of the computing unit, where n is a positive integer.

According to a preferred embodiment of the construction method of the present application, the construction method further comprises:

determining the number of the plurality of memory units at least according to data bit width of the computing unit and data bit width of a single memory unit.

According to a preferred embodiment of the construction method of the present application, the construction method further comprises:

arranging positions of the computing unit, the plurality of memory units and the routing unit in a respective computing submodule to be the same in each computing sub module.

According to a preferred embodiment of the construction method of the present application, the construction method further comprises:

in each computing submodule, arranging the computing unit and the routing unit to be at the center of a respective computing submodule, and locating the plurality of memory units around the computing unit and the routing unit in the respective computing submodule.

According to a preferred embodiment of the construction method of the present application, the construction method further comprises:

arranging each of the at least two computing submodules to be the same as each other.

According to a preferred embodiment of the construction method of the present application, each computing submodule comprises: at least two computing units, a plurality of memory units, and at least two routing units, wherein each routing unit is connected to at least one computing unit, and each routing unit is connected to at least one memory unit; the construction method further comprises:

connecting the at least two routing units to each other to form an overall routing unit, and connecting the overall routing unit, to each of the plurality of memory units; connecting the overall routing unit to an overall routing unit of at least one further computing submodule of the in-memory computing module where the overall routing unit is located, and connecting the overall routing unit to an overall routing unit of at least one further computing submodule of at least one further in-memory computing module; and configuring the overall routing unit to perform access of a first computing unit of the computing submodule where the overall routing unit is located to a first memory unit or a second computing unit of the computing submodule where the overall routing unit is located, access to a second memory unit or a third computing unit of at least one further computing submodule of the in-memory computing module where the overall routing unit is located, or to a third memory unit or a fourth computing unit of at least one further computing submodule of at least one further in-memory computing module.

According to a preferred embodiment of the construction method of the present application, the construction method further comprises:

connecting routing interface of each of the at least two routing units to at least one further routing unit of the computing sub module where the routing unit is located, and/or to a routing unit of at least one further computing sub module of the in-memory computing module where the routing unit is located, and/or to a routing unit of at least one further computing submodule of at least one further in-memory computing module;

connecting a memory control interface of each of the at least two routing units to at least one of the plurality of memory units.

According to a preferred embodiment of the construction method of the present application, the construction method further comprises:

connecting switching routing computing unit of each of the at least two routing units to the routing interface and a crossbar switch unit, storing, in the switching routing computing unit, at least routing information about the in-memory computing module where the routing unit is located and about at least one computing unit of the computing submodule where the routing unit is located, and configuring the switching routing computing unit to parse a received data access request and control the switching of the crossbar switch unit based on parsed data access request;

connecting memory control unit of each of the at least two routing units to the crossbar switch unit and the memory control interface, storing at least routing information about at least one of the plurality of memory units in the memory control unit, and configuring the memory control unit, in response to switching of the crossbar switch unit to the memory control unit, to perform secondary parse of the parsed data access request received from the crossbar switch unit to determine a destination memory unit, and to access the destination memory unit via the memory control interface.

According to a preferred embodiment of the construction method of the present application, the construction method further comprises: configuring each computing unit to access at least one memory unit directly via the overall routing unit. That is, the overall routing unit parses the data access request issued by the computing unit, acquires access data from the at least one memory unit directly, and forwards the access data to the computing unit that issued the data access request, wherein the data access request includes at least an address of the at least one memory unit.

According to a preferred embodiment of the construction method of the present application, the construction method further comprises: configuring each computing unit to access at least one further memory unit indirectly via the overall routing unit. That is, the overall routing unit parses the data access request issued by the computing unit, forwards the parsed data access request to an overall routing unit of at least one further computing submodule and forwards to a further computing unit connected to the overall routing unit of the at least one further computing submodule, acquires access data from at least one further memory unit indirectly via the further computing unit, and forwards the access data to the computing unit that issued the data access request, wherein the data access request includes at least an address of the at least one further memory unit, wherein the further computing unit can access the at least one further memory unit directly via the overall routing unit.

According to a preferred embodiment of the construction method of the present application, the construction method further comprises:
   connecting the overall routing unit, by a bonding connection, to an overall routing unit of at least one further computing submodule of the in-memory computing module where the overall routing unit is located.

According to a preferred embodiment of the construction method of the present application, the construction method further comprises:
   setting total data bit width of connection between the overall routing unit and an overall routing unit of at least one further computing submodule of the in-memory computing module where the overall routing unit is located to be n multiple of data bit width of the computing unit, where n is a positive integer.

According to a preferred embodiment of the construction method of the present application, the construction method further comprises:
   determining the number of the plurality of memory units at least according to data bit width of the computing unit and data bit width of a single memory unit.

According to a preferred embodiment of the construction method of the present application, the construction method further comprises:
   arranging positions of the at least two computing units, the plurality of memory units and the overall routing unit in a respective computing submodule to be the same in each computing sub module.

According to a preferred embodiment of the construction method of the present application, the construction method further comprises:
   in each computing submodule, arranging the at least two computing units and the overall routing unit to be at the center of a respective computing submodule, and locating the plurality of memory units around the at least two computing units and the overall routing unit in the respective computing sub module.

According to a preferred embodiment of the construction method of the present application, the construction method further comprises:
   arranging each of the at least two computing submodules to be the same as each other.

According to a preferred embodiment of the construction method of the present application, the construction method further comprises:
   arranging the memory unit to include a dynamic random access memory and arranging the computing unit to include a central processing unit.

According to a preferred embodiment of the construction method of the present application, the construction method further comprises:
   setting the at least two computing submodules to be two computing sub modules.

According to a preferred embodiment of the construction method of the present application, the construction method further comprises:
   arranging the storage capacity of the memory unit to be customizable.

According to an eighth aspect of the present application, there is provided a construction method of an in-memory computing network, comprising:
   connecting a plurality of in-memory computing modules to each other via the routing units thereof wherein the plurality of in-memory computing modules are a plurality of in-memory computing modules mentioned above.

According to a preferred embodiment of the construction method of the present application, the construction method further comprises:
   connecting the plurality of in-memory computing modules into bus, star, ring, tree, mesh and hybrid topologies.

According to a preferred embodiment of the construction method of the present application, the construction method further comprises:
   connecting the plurality of in-memory computing modules via routing units by metal wires.

BRIEF DESCRIPTION OF THE DRAWINGS

The present application will be more easily understood from the following description with reference to the drawings, in which.

DETAILED DESCRIPTION OF THE INVENTION

The embodiments of the present application will be further described in detail below with reference to the drawings.

Figure 1:
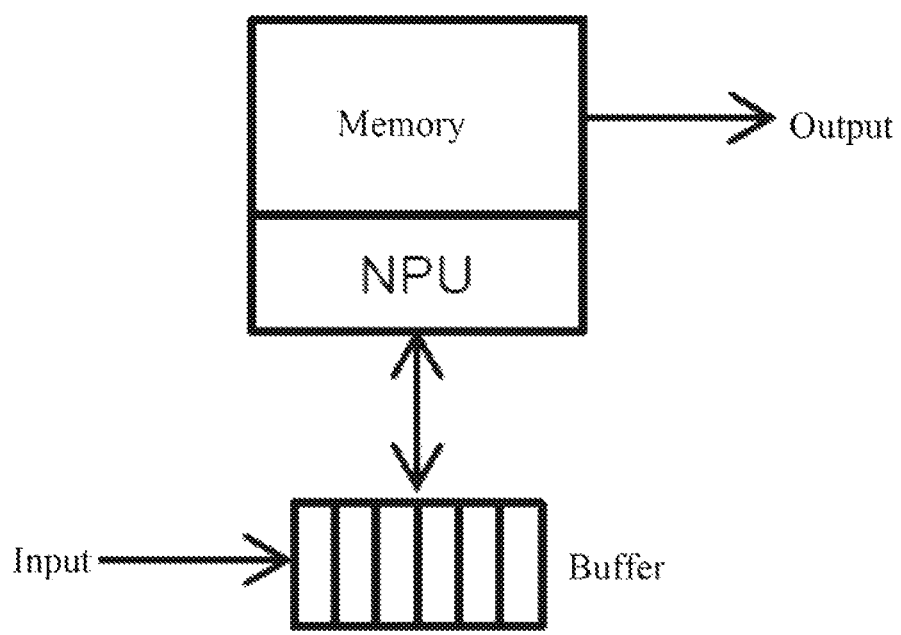
FIG. 1 is a schematic diagram of an in-memory computing structure in the prior art.
Figure 2:
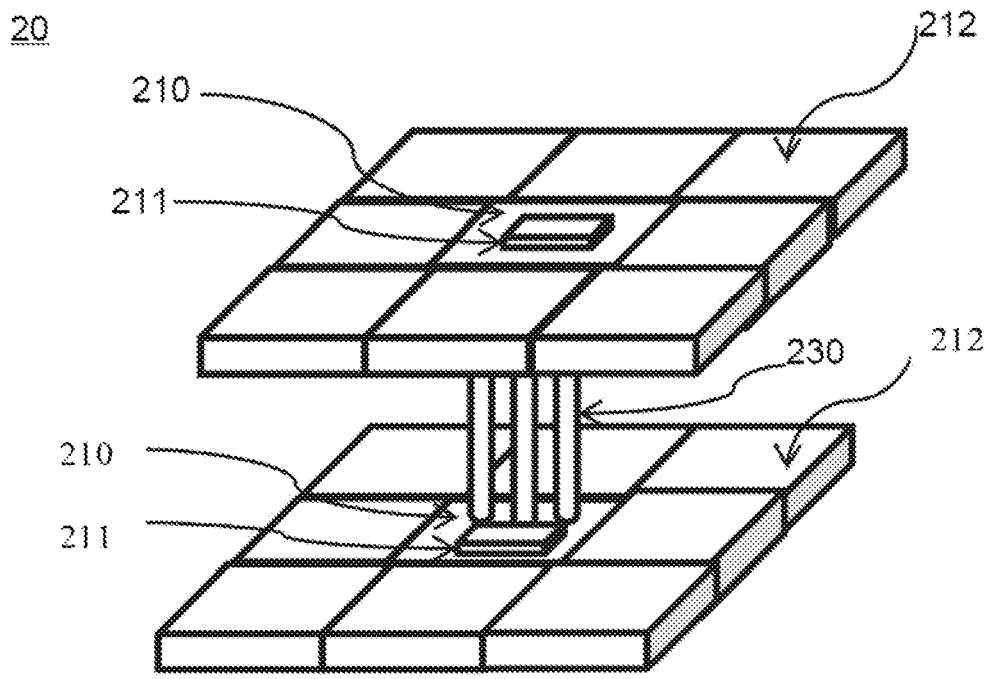
FIG. 2 is a schematic diagram of an in-memory computing module according to an embodiment of the present application.

FIG. 2 is a schematic diagram of an in-memory computing module 20 according to an embodiment of the present application.

The in-memory computing module 20 shown in FIG. 2 comprises two computing submodules (or referred to as two in-memory computing "layers"). An upper computing submodule and a lower computing submodule are stacked in sequence. As shown in FIG. 2, each computing submodule comprises a computing unit 210, a plurality of memory units 212 and a routing unit 211.

Nonetheless, the present application is not limited to two computing sub modules, and may also comprise more than two computing sub modules. in the case of more than two computing sub modules, these computing sub modules can be stacked in sequence in one direction (for example, referring to the circumstances in FIG. 2 where two computing submodules are stacked in sequence, in the case of more than two computing submodules, these computing submodules may be stacked in sequence above or below the two computing submodules shown in FIG. 2).

The two computing sub modules shown in FIG. 2 are positioned very closely, are located in the same chip and constitute a complete system. The complete system is also referred to as an in-memory computing module, or an in-memory computing node.

As shown in FIG. 2, each computing submodule comprises a computing unit 210, a routing unit 211 and eight memory units 212. Since the two computing sub modules 21, 22 are located in the same chip, all of the computing unit 210 and the memory units 212 are also integrated together, so that latency is small when the computing unit 210 accesses the memory units 212.

The two computing sub modules 21, 22 shown in FIG. 2 are the same as each other. The Mowing is mainly for the description of the computing submodule 21. It should be understood that all features of the computing submodule 21 are applicable to the computing submodule 22.

The memory unit 212 is a unit for storing operation data in the computing unit 210 and data exchanged with an external storage such as a hard disk. Since the technology of dynamic random access memory is relatively mature, the memory unit 212 is preferably a dynamic random access memory in the present application.

The number of memory units 212 is determined at least according to the data bit width of the computing unit 210 and the data bit width of a single memory unit 212.

For example, if there is one computing unit 210 in the computing submodule, the data bit width of the computing unit 210 is 64 bits, and the data bit width of a single memory unit 203 is 8 bits, then the required number of memory units 212 is eight (as shown in FIG. 2).

In addition, the storage capacity of the memory unit 212 can also be customized according to requirements.

The computing unit 210 is a final execution unit for information processing and program run, preferably a central processing unit.

In the computing submodule 21, the routing unit 211 is connected to the computing unit 210 and each memory unit 212. In addition, the routing unit 211 in the computing submodule 21 is connected to the routing unit 211 in the computing submodule 22. Furthermore, the routing unit 211 in the computing submodule 21 is also connected to a routing unit 211 of at least one further computing submodule of at least one further in-memory computing module. The main function of the routing unit 211 in the computing submodule 21 is to perform the access of a computing unit 210 of the computing submodule 21 to a memory unit 212 of the computing submodule 21, access to a computing unit 210 or a memory unit 212 of at least one further computing sub module 22, or access to a computing unit 210 or a memory unit 212 of at least one further computing submodule of at least one further in-memory computing module.

The computing unit 210 in the computing submodule 21 can access the memory unit 212 corresponding to the computing unit "directly" via the routing unit 211.

For example, referring to FIG. 2, the computing unit 210 in the computing submodule 21 can access all of the memory units 212 in the computing submodule 21 "directly" via the routing unit 211.

That is to say, if the computing unit 210 in the computing submodule 21 issues a data access request to any memory unit 212 in the computing submodule 21, the routing unit 211 in the computing submodule 21 can parse the data access request, acquire access data from any memory unit 212 in the computing submodule 21 "directly" and return the access data to the computing unit 210.

In addition, the computing unit 210 in the computing submodule 21 can access some other memory units 212 "indirectly" via the routing unit 211.

Referring to FIG. 2 again, if the computing unit 210 in the computing submodule 21 issues a data access request to any memory unit 212 in the computing submodule 22, then the routing unit 211 in the computing submodule 21 can parse the data access request, forward the parsed data access request to the routing unit 211 of the computing submodule 22 and forward to the computing unit 210 connected to the routing unit 211, acquire access data from any memory unit 212 "indirectly" via the computing unit 210 connected to the routing unit 211, and return the access data to the computing unit 210 that issues the data access request.

FIG. 2 shows an example of the arrangement of the computing unit 210, the routing unit 211 and a plurality of memory units 212 in the computing submodules 21, 22, wherein the computing unit 210 and the routing unit 211 are located at the center of a respective computing submodule, and a plurality of memory units 212 are located around the computing unit 210 and the routing unit 211 in the respective computing submodule.

Nonetheless, such an arrangement is illustrative rather than limiting. The embodiments where a plurality of memory units 212 distributed on one side of the computing unit 210 and the routing unit 211 or on both sides of the computing unit 210 and the routing unit 211, etc., also fall within the scope of the present application.

In addition, as shown in FIG. 2, in the computing submodule 21 and the computing submodule 22, the positions of the computing unit 210, the routing unit 211 and the plurality of memory units 212 are the same in respective computing submodules (the computing submodule 21 and the computing submodule 22 shown in FIG. 2 are identical with each other).

That is to say, the computing submodules 21, 22 of the in-memory computing module 20 shown in FIG. 2 have a layer-symmetric structure. Such a layer-symmetric structure facilitates the construction of topological networks so as to achieve large-scale or ultra-large-scale computing.

In FIG. 2, the connection of data interface between the respective computing submodules 21, 22 needs to be performed by means of the routing unit 210, preferably using a three-dimensional connection 230 process.

Common three-dimensional connection 230 processes include bonding connection methods, Through-Silicon Vias (TSV), flip-chip and wafer-level packaging. In the present application, the three-dimensional connection 230 process is preferably a bonding connection method.

Bonding connection is a common three-dimensional connection process, which is a wafer stacking process within a chip. Specifically, bonding connection is to connect wafers together by metal wires through a certain process so as to achieve the required electrical characteristics.

In addition, in order to ease the data transmission pressure, the total data bit width between the routing unit 211 of the computing submodule 21 and the routing unit 211 of the computing submodule 22 is n multiple of the data bit width of the computing unit 210, wherein n is a positive integer.

In FIG. 2, the access between different computing submodules 21, 22 needs to be realized via the connection between the routing units 210. If the total data bit width of the connection is the same as that of the computing unit 210, in the case of frequent data access operations between the computing submodules 21, 22 (i.e., in the case of high data throughput rate), the data throughput rate between the computing submodules 21, 22 also increases accordingly, and the connection may be congested. Therefore, the total data bit width of the connection is set to be a positive integer multiple of the data bit width of the computing unit 210. With respect to the specific circumstances shown in FIG. 2, the total data bit width of the connection is at most 8 multiple of the data bit width of the computing unit 210.

It should be understood that the specific value of the positive integer n is set according to business requirements. For example, in common system design, the bandwidth requirements for data transmission between different computing submodules within a chip can be derived according to business simulation, and the required data bit width can be derived according to the bandwidth requirements.

Assuming that the required data bandwidth between the two computing submodules 21, 22 is 144 Gb/s, and the total data bit width of the existing connection is 72$b$ and the clock is 1 GHz, then the data bandwidth of the connection will be 72 Gb/s. In this case, it is necessary to increase the data bit width of the connection to 144$b$ to adapt to the data bandwidth requirement.

Figure 3:
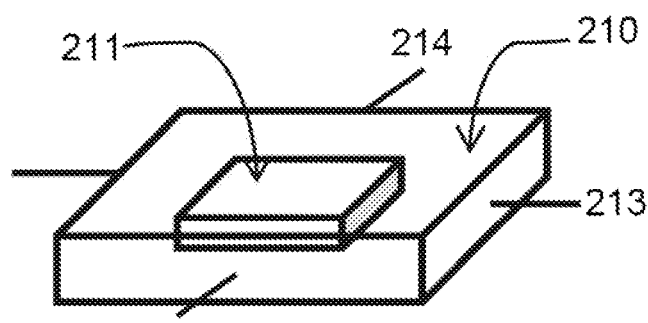
FIG. 3 is a schematic diagram of the relative positions between a routing unit and a computing unit and interfaces of the routing unit according to an embodiment of the present application.

FIG. 3 is a schematic diagram of the relative positions between the routing unit 211 and the computing unit 210 and interfaces of the routing unit 211 according to an embodiment of the present application.

As shown in FIG. 3, the routing unit 211 is arranged around the computing unit 210. Nonetheless, this arrangement is exemplary rather than limiting. The routing unit 211 may also be arranged on one side or both sides of the computing unit 210, which also fall within the scope of the present application.

FIG. 3 also schematically shows a memory control interface 213 and a routing interface 214 of the routing unit 211. These interfaces will be described in more detail with reference to FIG. 4.

Figure 4:
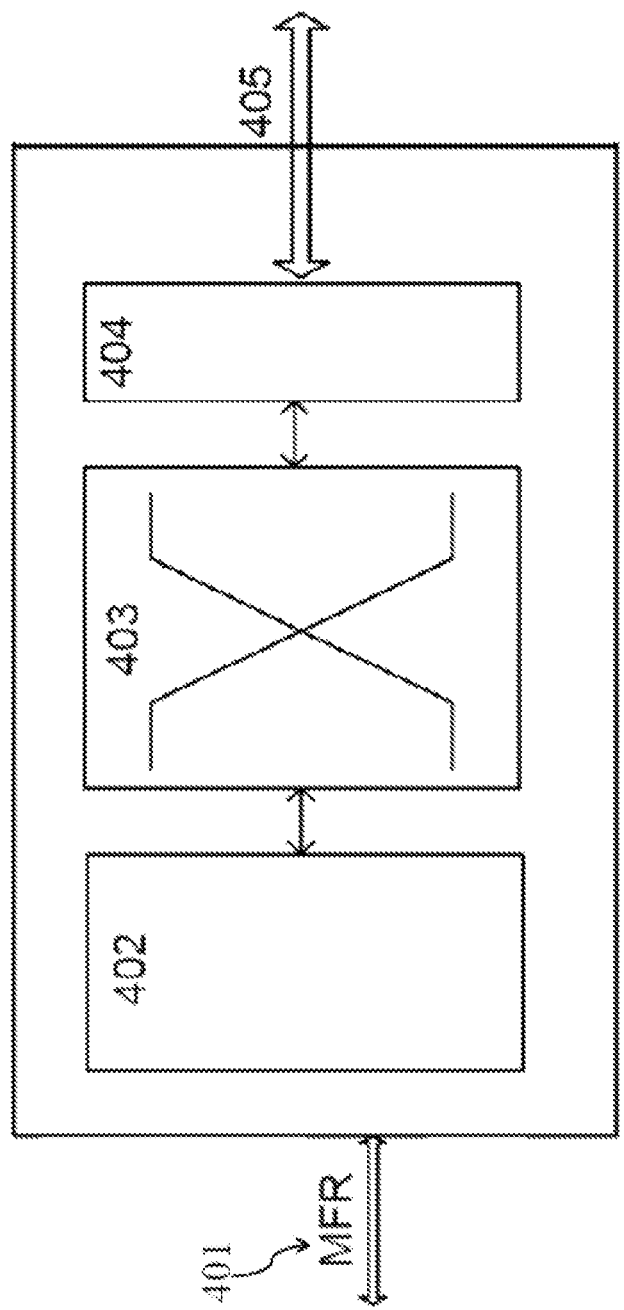
FIG. 4 is a schematic diagram of a routing unit according to an embodiment of the present application.

FIG. 4 is a schematic diagram of a routing unit according to an embodiment of the present application.

FIG. 4 shows external interfaces of the routing unit 211, which mainly include a routing interface 401 and a memory control interface 405. It should be understood that in order not to obscure the gist of the present application, FIG. 3 only shows the external interfaces involved in the present application, and these external interfaces are exemplary rather than limiting.

In FIG. 4, the routing interfaces are shown as memory front-end routing (MFR) interfaces 401, which connect the routing unit to a routing unit of at least one further computing submodule of the in-memory computing module where the routing unit is located, and/or which connect the routing unit to a routing unit of at least one further computing submodule of at least one further in-memory computing module.

For example, referring back to FIG. 2, the memory front-end routing interface 401 of the routing unit 211 in the computing submodule 21 is connected to the memory front-end routing interface 401 of the routing unit 211 in the computing submodule 22, and/or is connected to a memory front-end routing interface 401 of a routing unit of at least one further computing submodule of at least one further in-memory computing module.

The memory control interface is shown as a DDR operation interface (DDRIO-bonding), which is connected to each memory unit 212.

FIG. 4 shows additionally the internal structures of the routing unit 211, which mainly include a switching route computing unit 402, a crossbar switch unit 403 and a memory control unit 404. It should be understood that in order not to obscure the gist of the present application, FIG. 4 only shows the internal structures involved in the present application, and these internal structures are exemplary rather than limiting. It should be understood that the routing unit 211 should also include some buffer circuits, digital and analog circuits, and the like. For example, buffer circuits may buffer and prioritize data access requests from a plurality of computing units 210, and digital and analog circuits, for example, may operate in cooperation with the memory control unit 404, and so on.

In the present application, the switching route computing unit 402 stores routing information about the computing unit 210. The routing information may be stored in a form of for example, a routing table. Thus, the switching route computing unit 402 can determine information about whether the computing unit 210 in the data access request can "directly" access a memory unit via a route, and the like.

In addition, the switching route computing unit 402 also stores routing information about the in-memory computing module. The routing information may also be stored in the form of for example, a routing table. Thus, the switching route computing unit 402 can determine which in-memory computing module does the destination memory address or the destination computing unit address indicate (in the present in-memory computing module or in a further in-memory computing module) and the like. For example, based on information at a specific position (such as the first bit) in the destination memory address or destination computing unit address and the routing information, the switching route computing unit 402 can determine which in-memory computing module does the destination memory address or destination computing unit address indicate. By way of example, if the first bit of the destination memory address or destination computing unit address is 1, it is represented that the destination memory or destination computing unit is in a first in-memory computing module; if the first bit of the destination memory address or destination computing unit address is 3, it is represented that the destination memory or destination computing unit is in a third memory computing module.

The memory control unit 404 stores routing information about the memory unit 212. Thus, the memory control unit 404 can determine the port information corresponding to the memory unit in the data access request, and so on.

Figure 5:
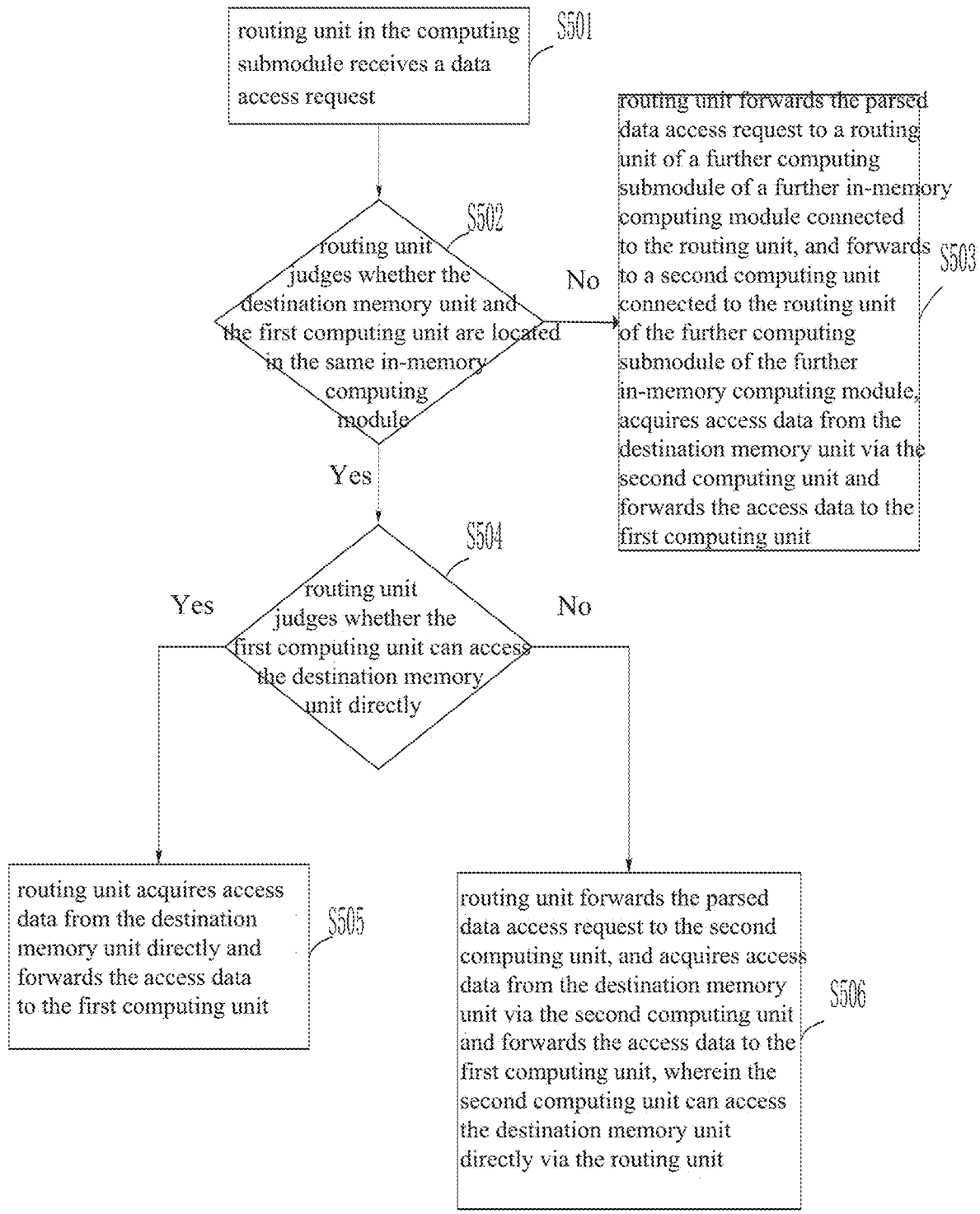
FIG. 5 is a flowchart of an in-memory computing method according to an embodiment of the present application.

FIG. 5 is a flowchart of an in-memory computing method according to an embodiment of the present application.

The in-memory computing method comprises the following steps:

Step S501: The routing unit in the computing submodule receives a data access request.

The data access request in this embodiment is issued by a first computing unit in the computing submodule and includes at least an address of a destination memory unit.

Step S502: The routing unit in the computing submodule parses the data access request, and the routing unit judges whether the destination memory unit and the first computing unit are located in the same in-memory computing module.

If the destination memory unit and the first computing unit are not located in the same in-memory computing module, step S503 is executed: the routing unit forwards the parsed data access request to a routing unit of a further computing submodule of a further in-memory computing module connected to the routing unit, and forward to a second computing unit connected to the routing unit of the further computing submodule of the further in-memory computing module, acquires access data from the destination memory unit via the second computing unit and forwards the access data to the first computing unit.

If the destination memory unit and the first computing unit are located in the same in-memory computing module, step S504 is executed: the routing unit judges whether the first computing unit can access the destination memory unit directly.

If the first computing unit can access the destination memory unit directly via the routing unit, step S505 is executed: the routing unit acquires access data from the destination memory unit directly and forwards the access data to the first computing unit.

If the first computing unit cannot access the destination memory unit directly via the routing unit, step S506 is executed: the routing unit forwards the parsed data access request to the second computing unit, and acquires access data from the destination memory unit via the second computing unit and forwards the access data to the first computing unit, wherein the second computing unit can access the destination memory unit directly via the routing unit.

The method flowchart in FIG. 5 is merely schematic and does not have to be performed in this order. For example, it is possible to first judge whether the first computing unit can access the destination memory unit directly and then judge whether the destination memory unit and the first computing unit are located in the same in-memory computing module.

Figure 6:
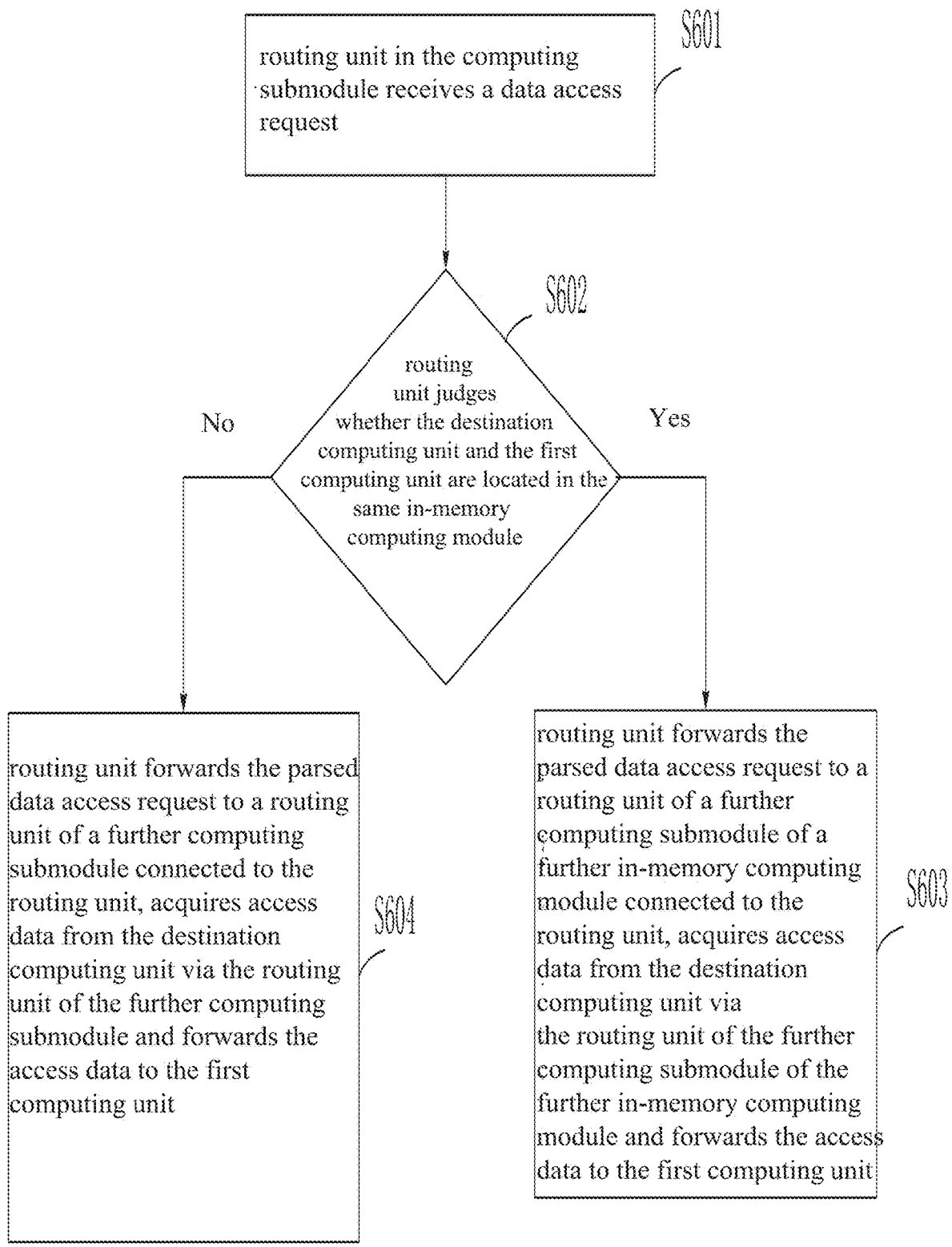
FIG. 6 is a flowchart of an in-memory computing method according to another embodiment of the present application.

FIG. 6 is a flowchart of an in-memory computing method according to another embodiment of the present application.

The in-memory computing method comprises the following steps:

Step S601: The routing unit in the computing submodule receives a data access request. The data access request in this embodiment is issued by the first computing unit in the computing submodule and includes at least an address of a destination computing unit.

Step S602: The routing unit in the computing submodule parses the data access request, and the routing unit judges whether the destination computing unit and the first computing unit are located in the same in-memory computing module.

If the destination computing unit and the first computing unit are located in the same in-memory computing module, step S603 is executed: the routing unit forwards the parsed data access request to a routing unit of a further computing submodule connected to the routing unit, acquires access data from the destination computing unit via the routing unit of the further computing submodule and forwards the access data to the first computing unit.

If the destination computing unit and the first computing unit are not located in the same in-memory computing module, step S604 is executed: the routing unit forwards the parsed data access request to a routing unit of a further computing submodule of a further in-memory computing module connected to the routing unit, acquires access data from the destination computing unit via the routing unit of the further computing submodule of the further in-memory computing module and forwards the access data to the first computing unit.

With reference to FIG. 2 to FIG. 4, the external interface and internal structure of the routing unit 211 and the in-memory computing method in FIG. 5 and FIG. 6 will be further understood with respect to the fallowing five scenarios of data stream processing in the in-memory computing module below.

Referring again to FIG. 2, it is assumed that the computing unit 210 in the computing submodule 21 can access all the memory units 212 "directly" via the routing unit 211, and the computing unit 210 in the computing submodule 22 can access all the memory units 212 "directly" via the routing unit 211.

Scenario (I): The computing unit 210 in the computing submodule 21 accesses any memory unit 212 in the computing submodule 21.

The computing unit 210 in the computing submodule 21 issues a data access request to a switching routing computing unit 402 via a routing interface MFR. The switching routing computing unit 402 parses the data access request to obtain a destination memory address, and judges whether the destination memory address is in the same in-memory computing module as the computing unit 210 (but does not parse out the specific memory unit) (in this case, it is judged that the destination memory address is in the same in-memory computing module as the computing unit 210), and judges whether the computing unit 210 in the computing submodule 21 can access any memory unit 212 in the computing submodule 21 "directly" (in this case, it is judged that the computing unit 210 in the computing submodule 21 can access any memory unit 212 in the computing submodule 21 "directly").

Afterwards, the switching routing computing unit 402. queries the destination memory address from the routing information about the computing unit and the in-memory computing module stored therein, determines the port information corresponding to the destination memory address, and then controls the open and close of the crossbar switch unit 403, so that the parsed data access request is sent to the memory control unit 404 fur secondary parse to obtain which memory unit needs to be specifically accessed. Then, the switching routing computing unit 402 accesses any memory unit 212 in the computing submodule 21 via the memory control (DDRIO-bonding) interface.

Scenario (II): The computing unit 210 in the computing submodule 21 accesses any memory unit 212 in the computing sub module 21.

The computing unit 210 in the computing submodule 21 issues a data access request to a switching routing computing unit 402 via a routing interface MFR. The switching routing computing unit 402 parses the data access request to obtain a destination memory address, and judges whether the destination memory address is in the same in-memory computing module as the computing unit 210 (but does not parse out the specific memory unit) (in this case, it is judged that the destination memory address is in the same in-memory computing module as the computing unit 210), and judges whether the computing unit 210 in the computing submodule 21 can access any memory unit 212 in the computing submodule 21 "directly" (in this case, it is determined that the computing unit 210 in the computing submodule 21 cannot access any memory unit 212 in the computing submodule 21 "directly").

Afterwards, the switching routing computing unit 402 queries the destination memory address from the routing information about the computing unit and the in-memory computing module stored therein, determines the port information corresponding to the destination memory address, and then controls the open and close of the crossbar switch unit 403, so that the parsed data access request is sent to the routing unit 211 of the computing submodule 22 via the routing interface MFR and is sent to the computing unit 210 connected to the routing unit 211 of the computing submodule 22. The computing unit 210 connected to the routing unit 211 of the computing submodule 22 performs the operation as in the scenario (I), and then accesses any memory unit 212 in the computing submodule 22 via a memory control (DDRIO-bonding) interface.

Scenario (III): The computing unit 210 in the computing submodule 21 accesses the memory unit 212 of a further in-memory computing module.

The computing unit 210 in the computing submodule 21 issues a data access request to the switching routing computing unit 402 via the routing interface MFR. The switching routing computing unit 402 parses the data access request to obtain a destination memory address, and judges whether the destination memory address is in the same in-memory computing module as the computing unit 210 (but does not parse out the specific memory unit) (in this case, it is judged that the destination memory address is not in the same in-memory computing module as the computing unit 210).

Afterwards, the switching routing computing unit 402 controls the open and close of the crossbar switch unit 403, and issues the parsed data access request to a further in-memory computing module via the routing interface MFR.

The further in-memory computing module performs the operations as in the above-mentioned scenarios (I) and (II), and then accesses the memory unit 212 of a further in-memory computing module via the memory control (DDRIO-bonding) interface of the routing unit of the further in-memory computing mod tile.

Scenario (IV): The computing unit 210 in the computing submodule 21 accesses the computing unit 210 in the computing submodule 22.

The computing unit 210 in the computing submodule 21 issues a data access request to the switching routing computing unit 402 via the routing interface MFR. The switching routing computing unit 402 parses the data access request to obtain a destination computing unit address, and judges whether the destination computing unit address is in the same in-memory computing module as the computing unit 210 (in this case, it is judged that the destination computing unit address is in the same in-memory computing module as the computing unit 210).

Afterwards, the switching route computing unit 402 queries the destination computing address from the routing information about the computing unit and the in-memory computing module stored therein, determines the port information corresponding to the destination computing unit address, and then controls the open and close of the crossbar switch unit 403. The switching route computing unit 402 accesses the routing unit 211 of the computing submodule 22 via the routing interface MFR, and the computing unit 210 connected to the routing unit 211 of the computing submodule 22.

Scenario (V): The computing unit 210 in the computing sub module 21 accesses the computing unit 210 of a further in-memory computing module.

The computing unit 210 in the computing submodule 21 issues a data access request to the switching routing computing unit 402 via the routing interface MFR. The switching routing computing unit 402 parses the data access request to obtain a destination computing unit address, and judges whether the destination computing unit address is in the same in-memory computing module as the computing unit 210 (in this case, it is judged that the destination computing unit address is not in the same in-memory computing module as the computing unit 210).

Afterwards, the switching route computing unit 402 controls the open and close of the crossbar switch unit 403, and issues the parsed data access request to a further in-memory computing module via the routing interface MFR.

The further in-memory computing module performs the operation as in the above-mentioned scenario (IV), and then accesses the routing unit 211 of a further in-memory computing module via the routing interface MFR and accesses the computing unit 210 connected to the routing unit 211 of the further in-memory computing module.

Figure 7:
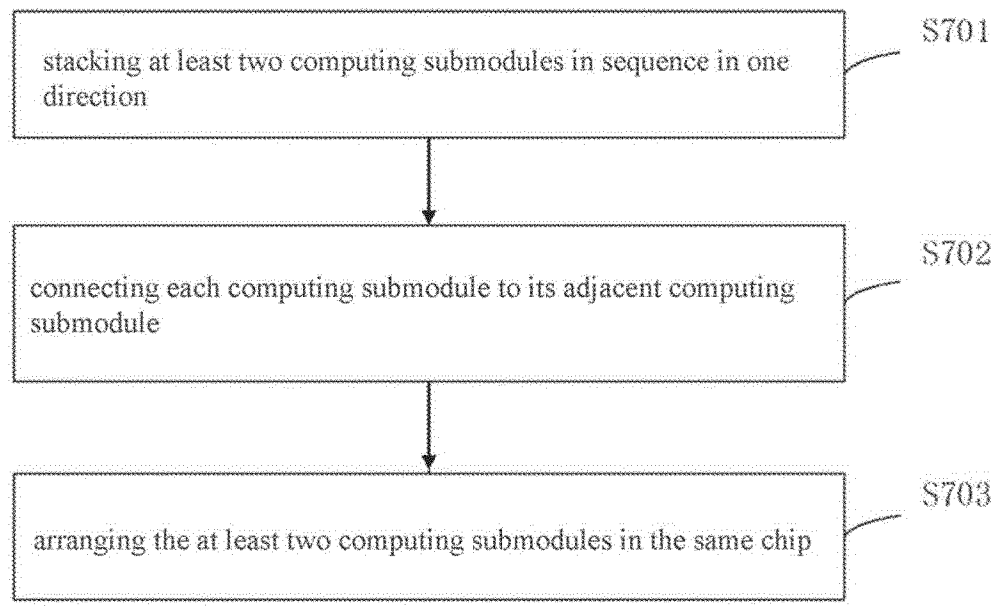
FIG. 7 is a flowchart of a construction method of an in-memory computing module according to an embodiment of the present application.

FIG. 7 is a flowchart of a construction method of an in-memory computing module according to an embodiment of the present application.

The construction method of an in-memory computing module comprises the following steps:

Step S701: Stacking at least two computing submodules in sequence in one direction.

Step S702: Connecting each computing submodule to its adjacent computing submodule, wherein each computing submodule comprises at least one computing unit 210 and a plurality of memory units 212.

Step S703: Arranging the at least two computing sub modules in the same chip.

Figure 8:
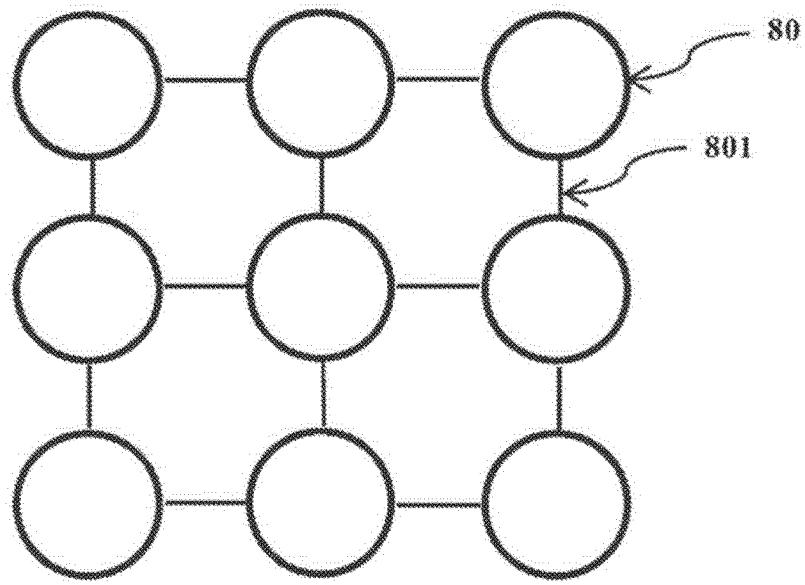
FIG. 8 is a schematic diagram of an in-memory computing network according to an embodiment of the present application.

FIG. 8 is a schematic diagram of an in-memory computing network according to an embodiment of the present application.

The in-memory computing network shown in FIG. 8 comprises: a plurality of in-memory computing modules 80, which are a plurality of in-memory computing modules as described above that are connected via the routing units thereof.

High data bandwidth and high performance computation can be achieved through the interconnection and topology of in-memory computing modules.

FIG. 8 shows a typical mesh topology. It should be understood that a plurality of in-memory computing modules 80 may also be connected into bus, star, ring, tree and hybrid topologies.

In the present application, the plurality of in-memory computing modules are connected to each other via routing units by metal wire connection 801. The metal wire connection herein is a metal wire connection traditionally used in two-dimensional connections.

In the present application, the computing submodule comprising a single routing unit 211 serves as an example. Nonetheless, the present application is not limited to one routing unit, and may comprise more than one routing unit. In the case of more than one routing unit, these routing units can be connected via routing interfaces MFR (similar to the operation between the routing interface MFR of one in-memory computing module and the routing interface MFR of a further in-memory computing module) to form an overall routing unit.

The overall routing unit presents the same functions to the outside as the single routing unit 210 shown in FIG. 2. The overall routing unit differs from the single routing unit 210 in FIG. 2 in that each routing unit in the overall routing unit is not connected to each memory unit in the memory sub module.

For example, if there are three routing units in the computing submodule, two routing units constitute an overall routing unit. For example, it is assumed that there are three routing units in the computing submodule 21 of FIG. 2: a routing unit A connected to the leftmost three memory units 212 and associated computing units 210; a routing unit B connected to the middle two memory units 212 and associated computing units 210, and a routing unit C connected to the rightmost three memory units 212 and associated computing units 210.

If the computing unit 210 connected to the routing unit A needs to access any of the middle two memory units, the access requires to be performed via the routing interface MYR between the routing unit A and the routing unit B. The operation is similar to the above-mentioned scenario (III). The specific description is as follows:

In a routing unit A, the computing unit 210 connected to the routing unit A issues a data access request to the switching routing computing unit 402 via the routing interface MFR of the routing unit A. The switching routing computing unit 402 parses the data access request to obtain a destination memory address, and judges whether the destination memory address is within the addressing range of the routing unit A (in this case, it is judged that the destination memory address is not within the addressing range of the routing unit A). Afterwards, the switching route computing unit 402 controls the open and close of the crossbar switch unit 403, issues the parsed data access request to a router B via the routing interface MFR and accesses any of the middle two memory units via the router B.

It should be noted that the above-mentioned embodiments illustrate rather than limit the invention, and that the person skilled in the art will be able to design many alternative embodiments without departing from the scope of the appended claims. It should be understood that the scope of the present application is defined by the claims.

The invention claimed is:

1. An in-memory computing module, comprising:
  at least two computing submodules, wherein the at least two computing submodules are stacked in sequence in one direction, wherein each computing submodule is connected to its adjacent computing submodule, and wherein each computing submodule comprises:
    at least one computing unit;
    a plurality of memory units; and
    a routing unit connected to a computing unit of the at least one computing unit and at least a portion of the plurality of memory units,
  wherein the at least two computing submodules are located in the same chip, and
  wherein, in each of the computing submodules, the computing unit and the routing unit are located at a center of the respective computing submodule, and the plurality of memory units are distributed around the computing unit and the routing unit in the respective computing submodule.

2. The in-memory computing module according to claim 1,
  wherein the routing unit is connected to a routing unit of at least one further computing submodule of the in-memory computing module where the routing unit is located, and wherein the routing unit is connected to a routing unit of at least one further computing submodule of at least one further in-memory computing module;
  wherein the routing unit is configured to perform access of a first computing unit of the computing submodule where the routing unit is located to a first memory unit of the computing submodule where the routing unit is located, access to a second computing unit or a second memory unit of the at least one further computing submodule of the in-memory computing module where the routing unit is located, or access to a third computing unit or a third memory unit of the at least one further computing submodule of the at least one further in-memory computing module.

3. The in-memory computing module according to claim 2, wherein the routing unit comprises:
  a routing interface, which connects the routing unit to the routing unit of the at least one further computing submodule of the in-memory computing module where the routing unit is located, and/or which connects the routing unit to the routing unit of the at least one further computing submodule of the at least one further in-memory computing module;
  a memory control interface, which connects the routing unit to each of the plurality of memory units.

4. The in-memory computing module according to claim 3, wherein the routing unit further comprises:
  a crossbar switch unit;
  a switching routing computing unit, wherein the switching routing computing unit is connected to the routing interface and the crossbar switch unit, wherein the switching routing computing unit stores at least routing information about the in-memory computing module where the routing unit is located and about the computing unit of the computing submodule where the routing unit is located, and wherein the switching routing computing unit parses a received data access request and controls switching of the crossbar switch unit based on parsed data access request;
  a memory control unit, wherein the memory control unit is connected to the crossbar switch unit and the memory control interface, wherein the memory control unit stores at least routing information about the plurality of memory units, and wherein the memory control unit, in response to switching of the crossbar switch unit to the memory control unit, performs secondary parse of the parsed data access request received from the crossbar switch unit to determine a destination memory unit, and accesses the destination memory unit via the memory control interface.

5. The in-memory computing module according to claim 2, wherein the routing unit is connected, by a bonding connection, to the routing unit of the at least one further computing submodule of the in-memory computing module where the routing unit is located.

6. The in-memory computing module according to claim 5, wherein total data bit width of connection between the routing unit and the routing unit of the at least one further computing submodule of the in-memory computing module where the routing unit is located is n multiple of data bit width of the computing unit, where n is a positive integer.

7. The in-memory computing module according to claim 2, wherein the number of the plurality of memory units is determined at least according to data bit width of the computing unit and data bit width of a single memory unit.

8. The in-memory computing module according to claim 1, wherein each of the computing submodules comprises:
  at least two computing units including the at least one computing unit;
  at least two routing units including the routing unit, each of the routing units connected to at least one computing unit, and each of the routing units connected to at least one memory unit;
  wherein the at least two routing units are connected to each other to form an overall routing unit, wherein the overall routing unit is connected to each of the plurality of memory units, wherein the overall routing unit is connected to an overall routing unit of at least one further computing submodule of the in-memory computing module where the overall routing unit is located, and wherein the overall routing unit is connected to an overall routing unit of at least one further computing submodule of at least one further in-memory computing module;

wherein the overall routing unit is configured to perform access of a first computing unit of the computing submodule where the overall routing unit is located to a first memory unit or a second computing unit of the computing submodule where the overall routing unit is located, access to a second memory unit or a third computing unit of the at least one further computing submodule of the in-memory computing module where the overall routing unit is located, or access to a third memory unit or a fourth computing unit of the at least one further computing submodule of the at least one further in-memory computing module.

9. The in-memory computing module of claim 8, wherein each of the at least two routing units comprises:

a routing interface, which connects the routing unit to at least one further routing unit of the computing submodule where the routing unit is located, and/or which connects the routing unit to a routing unit of the at least one further computing submodule of the in-memory computing module where the routing unit is located, and/or which connects the routing unit to a routing unit of the at least one further computing submodule of the at least one further in-memory computing module;

a memory control interface, which connects the routing unit to at least one of the plurality of memory units.

10. The in-memory computing module according to claim 9, wherein each of the at least two routing units further comprises:

a crossbar switch unit;

a switching routing computing unit, wherein the switching routing computing unit is connected to the routing interface and the crossbar switch unit, wherein the switching routing computing unit stores at least routing information about the in-memory computing module where the routing unit is located and about at least one computing unit of the computing submodule where the routing unit is located, wherein the switching routing computing unit parses a received data access request and controls switching of the crossbar switch unit based on parsed data access request;

a memory control unit, wherein the memory control unit is connected to the crossbar switch unit and the memory control interface, wherein the memory control unit stores at least routing information about at least one of the plurality of memory units, wherein the memory control unit, in response to switching of the crossbar switch unit to the memory control unit, performs secondary parse of the parsed data access request received from the crossbar switch unit to determine a destination memory unit, and accesses the destination memory unit via the memory control interface.

11. The in-memory computing module according to claim 8, wherein in each computing submodule, the at least two computing units and the overall routing unit are located at the center of the respective computing submodule, and the plurality of memory units are distributed around the at least two computing units and the overall routing unit in the respective computing submodule.

12. An in-memory computing method, which is used for an in-memory computing module, wherein the in-memory computing module comprises:

at least two computing submodules, wherein the at least two computing submodules are stacked in sequence in one direction, wherein each computing submodule is connected to its adjacent computing submodule, and wherein each computing submodule comprises:

at least one computing unit, a plurality of memory units, and a routing unit connected to a computing unit of the at least one computing unit and at least a portion the plurality of memory units;

wherein the at least two computing submodules are located in the same chip, and wherein, in each of the computing submodules, the computing unit and the routing unit are located at a center of the respective computing submodule, and the plurality of memory units are distributed around the computing unit and the routing unit in the respective computing submodule;

wherein the in-memory computing method comprising the following steps carried out by the routing unit:

receiving a data access request, wherein the data access request is issued by a first computing unit of the at least one computing unit and includes at least an address of a destination memory unit; and parsing the data access request, acquiring access data from the destination memory unit, and forwarding the access data to the first computing unit.

13. The in-memory computing method according to claim 12, further comprising the following steps carried out by the routing unit connected to the first computing unit:

after the routing unit parses the data access request and before the routing unit acquires access data from the destination memory unit, judging whether the first computing unit can access the destination memory unit directly via the routing unit connected to the first computing unit;

under the condition that the first computing unit can access the destination memory unit directly via the routing unit connected to the first computing unit, acquiring access data directly from the destination memory unit and forwarding the access data to the first computing unit; and under the condition that the first computing unit cannot access the destination memory unit directly via the routing unit connected to the first computing unit, forwarding parsed data access request to a second computing unit, and acquiring access data from the destination memory unit via the second computing unit and forwarding the access data to the first computing unit.

14. The in-memory computing method according to claim 13, further comprising the following steps carried out by the routing unit connected to the first computing unit:

under the condition that the first computing unit cannot access the destination memory unit directly via the routing unit connected to the first computing unit, and before the routing unit connected to the first computing unit forwards the parsed data access request to the second computing unit, judging whether the destination memory unit and the first computing unit are located in the same in-memory computing module;

under the condition that the destination memory unit and the first computing unit are located in the same in-memory computing module, forwarding the parsed data access request to a routing unit of a further computing submodule connected to the routing unit connected to the first computing unit, and forwarding to the second computing unit connected to the routing unit of the further computing submodule, and acquiring access data from the destination memory unit via the second computing unit and forwarding the access data to the first computing unit, wherein the second computing unit can access the destination memory unit directly via the routing unit of the further computing submodule;

under the condition that the destination memory unit and the first computing unit are not located in the same in-memory computing module, forwarding the parsed data access request to a routing unit of a further computing submodule of a further in-memory computing module connected to the routing unit connected to the first computing unit, and forwarding to the second computing unit connected to the routing unit of the further computing submodule of the further in-memory computing module, and acquiring access data from the destination memory unit via the second computing unit and forwarding the access data to the first computing unit, wherein the second computing unit can access the destination memory unit directly via the routing unit of the further computing submodule of the further in-memory computing module.

15. The in-memory computing method according to claim 12, wherein the in-memory computing method comprising the following steps carried out by the routing unit:

after the routing unit parses the data access request and before the routing unit acquires access data from the destination computing unit, judging whether the destination computing unit and the first computing unit are located in the same in-memory computing module;

under the condition that the destination computing unit and the first computing unit are located in the same in-memory computing module, forwarding the parsed data access request to a routing unit of a further computing submodule connected to the routing unit connected to the first computing unit, and acquiring access data from the destination computing unit via the routing unit of the further computing submodule and forwarding the access data to the first computing unit;

under the condition that the destination computing unit and the first computing unit are not located in the same in-memory computing module, forwarding parsed data access request to a routing unit of a further computing submodule of a further in-memory computing module connected to the routing unit connected to the first computing unit, and acquiring access data from the destination computing unit via the routing unit of the further computing submodule of the further in-memory computing module and forwarding the access data to the first computing unit.

16. The in-memory computing method according to claim 12, wherein each of the computing submodules comprises:

at least two computing units including the at least one computing unit; and at least two routing units including the routing unit, each of the routing units connected to at least one computing unit, and each of the routing units connected to at least one memory unit;

wherein the at least two routing units are connected to each other to form an overall routing unit, wherein the overall routing unit is connected to each of the plurality of memory units, wherein the overall routing unit is connected to an overall routing unit of at least one further computing submodule of the in-memory computing module where the overall routing unit is located, and wherein the overall routing unit is connected to an overall routing unit of at least one further computing submodule of at least one further in-memory computing module;

wherein the in-memory computing method comprising the following steps carried out by the overall routing unit:

receiving the data access request, wherein the data access request is issued by the first computing unit and includes at least the address of the destination memory unit; and, parsing the data access request, acquiring access data from the destination memory unit, and forwarding the access data to the first computing unit; and wherein the in-memory computing method further comprises the following steps carried out by the overall routing unit connected to the first computing unit:

after the overall routing unit parses the data access request and before the overall routing unit acquires the access data from the destination memory unit, judging whether the first computing unit can access the destination memory unit directly via the overall routing unit connected to the first computing unit;

under the condition that the first computing unit can access the destination memory unit directly via the overall routing unit connected to the first computing unit, acquiring access data directly from the destination memory unit and forwarding the access data to the first computing unit; and under the condition that the first computing unit cannot access the destination memory unit directly via the overall routing unit connected to the first computing unit, forwarding parsed data access request to a second computing unit, and acquiring access data from the destination memory unit via the second computing unit, and forwarding the access data to the first computing unit.

17. The in-memory computing method according to claim 16, further comprising the following steps carried out by the overall routing unit connected to the first computing unit:

under the condition that the first computing unit cannot access the destination memory unit directly via the overall routing unit connected to the first computing unit and before the overall routing unit connected to the first computing unit forwards the parsed data access request to the second computing unit, judging whether the destination memory unit and the first computing unit are located in the same in-memory computing module, under the condition that the destination memory unit and the first computing unit are located in the same in-memory computing module, forwarding the parsed data access request to the overall routing unit of the further computing submodule connected to the overall routing unit connected to the first computing unit, and forwarding to the second computing unit connected to the overall routing unit of the further computing submodule, and acquiring access data from the destination memory unit via the second computing unit and forwarding the access data to the first computing unit, wherein the second computing unit can access the destination memory unit directly via the overall routing unit of the further computing submodule;

under the condition that the destination memory unit and the first computing unit are not located in the same in-memory computing module, forwarding the parsed data access request to the overall routing unit of the further computing submodule of the further in-memory computing module connected to the overall routing unit connected to the first computing unit, and forwarding to the second computing unit connected to the overall routing unit of the further computing submodule of the further in-memory computing module, and acquiring access data from the destination memory unit via the second computing unit and forwarding the access data to the first computing unit, wherein the second computing unit can access the destination memory unit directly via the overall routing unit of the further computing submodule of the further in-memory computing module.

18. The in-memory computing method according to claim 12, wherein each of the computing submodules comprises:
at least two computing units including the at least one computing unit; and
at least two routing units including the routing unit, each of the routing units connected to at least one computing unit, and each of the routing units connected to at least one memory unit;
wherein the at least two routing units are connected to each other to form an overall routing unit, wherein the overall routing unit is connected to each of the plurality of memory units, wherein the overall routing unit is connected to an overall routing unit of at least one further computing submodule of the in-memory computing module where the overall routing unit is located, and wherein the overall routing unit is connected to an overall routing unit of at least one further computing submodule of at least one further in-memory computing module;
wherein the in-memory computing method comprising the following steps carried out by the overall routing unit:
receiving the data access request, wherein the data access request is issued by the first computing unit and includes at least the address of the destination memory unit; and,
parsing the data access request, acquiring access data from the destination computing unit, and forwarding the access data to the first computing unit; and
wherein the in-memory computing method further comprises the following steps carried out by the overall routing unit connected to the first computing unit:
after the overall routing unit parses the data access request and before the overall routing unit acquires access data from the destination computing unit, judging whether the destination computing unit and the first computing unit are located in the same in-memory computing module;
under the condition that the destination memory unit and the first computing unit are located in the same in-memory computing module, forwarding the parsed data access request to the overall routing unit of the further computing submodule connected to the overall routing unit connected to the first computing unit, and acquiring access data from the destination computing unit via the overall routing unit of the further computing submodule and forwarding the access data to the first computing unit;
under the condition that the destination computing unit and the first computing unit are not located in the same in-memory computing module, forwarding parsed data access request to the overall routing unit of the further in-memory computing module connected to the overall routing unit connected to the first computing unit, and acquiring access data from the destination computing unit via the overall routing unit of the further in-memory computing module and forwarding the access data to the first computing unit.

19. An in-memory computing network, comprising:
a plurality of in-memory computing modules, wherein each of the plurality of in-memory computing module comprises:
at least two computing submodules, wherein the at least two computing submodules are stacked in sequence in one direction, wherein each computing submodule is connected to its adjacent computing submodule, and wherein each computing submodule comprises;
at least one computing unit;
a plurality of memory units; and
a routing unit connected to a computing unit of the at least one computing unit and at least a portion of the plurality of memory units,
wherein the at least two computing submodules are located in the same chip; and wherein the plurality of in-memory computing module are connected to each other via the routing units thereof,
wherein, in each of the computing submodules, the computing unit and the routing unit are located at a center of the respective computing submodule, and the plurality of memory units are distributed around the computing unit and the routing unit in the respective computing submodule.

* * * * *

UNITED STATES PATENT AND TRADEMARK OFFICE
CERTIFICATE OF CORRECTION

Page 1 of 4

PATENT NO. : 12,124,736 B2
APPLICATION NO. : 18/013052
DATED : October 22, 2024
INVENTOR(S) : Xiping Jiang, Xiaofeng Zhou and Fengguo Zuo It is certified that error appears in the above-identified patent and that said Letters Patent is hereby corrected as shown below:

On the Title Page

Replace the title page with the attached title pages showing the corrected number of drawing sheets.

In the Drawings

Fig. 7 and Fig. 8 were inadvertently left off. Please see attached drawing sheet 6 of 6 with the missing Fig. 7 and Fig. 8.

Signed and Sealed this
Sixth Day of May, 2025

Coke Morgan Stewart
*Acting Director of the United States Patent and Trademark Office*

(12) United States Patent
Jiang et al.

(10) Patent No.: US 12,124,736 B2
(45) Date of Patent: Oct. 22, 2024

(54) IN-MEMORY COMPUTING MODULE AND METHOD, AND IN-MEMORY COMPUTING NETWORK AND CONSTRUCTION METHOD THEREFOR

(71) Applicant: XI'AN UNIIC SEMICONDUCTORS CO., LTD., Xi'an (CN)

(72) Inventors: Xiping Jiang, Xi'an (CN); Xiaofeng Zhou, Xi'an (CN); Fengguo Zuo, Xi'an (CN)

(73) Assignee: XI'AN UNIIC SEMICONDUCTORS CO., LTD., Xi'an (CN)

( * ) Notice: Subject to any disclaimer, the term of this patent is extended or adjusted under 35 U.S.C. 154(b) by 64 days.

(21) Appl. No.: 18/013,052

(22) PCT Filed: Jan. 26, 2021

(86) PCT No.: PCT/CN2021/073751
§ 371 (c)(1),
(2) Date: Dec. 27, 2022

(87) PCT Pub. No.: WO2022/021821
PCT Pub. Date: Feb. 3, 2022

(65) Prior Publication Data
US 2023/0244415 A1 Aug. 3, 2023

(30) Foreign Application Priority Data
Jul. 30, 2020 (CN) .......................... 202010754206.9

(51) Int. Cl.
*G06F 3/06* (2006.01)
(52) U.S. Cl.
CPC .......... *G06F 3/0658* (2013.01); *G06F 3/0622* (2013.01); *G06F 3/067* (2013.01)
(58) Field of Classification Search
CPC ....... G06F 3/0658; G06F 3/0622; G06F 3/067
See application file for complete search history.

(56) References Cited

U.S. PATENT DOCUMENTS 9,432,298 B1 * 8/2016 Smith ................ H04L 49/9057
2016/0041856 A1 * 2/2016 Sankaralingam ... G06F 15/7821
719/330
(Continued)

FOREIGN PATENT DOCUMENTS

| CN | 101145147 A | 3/2008 |
| CN | 111159094 A | 4/2016 |

(Continued)

OTHER PUBLICATIONS

A dictionary.com defintion of the term "further" captured by archive.org on Mar. 16, 2016 (Year: 2016).*

(Continued)

*Primary Examiner* — Tim T Vo
*Assistant Examiner* — Janice M. Girouard
(74) *Attorney, Agent, or Firm* — Christopher L. Bernard; Clements Bernard Walker

(57) ABSTRACT

The present application relates to an in-memory computing module and method, and an in-memory computing network and a construction method therefor. The in-memory computing module comprises at least two computing submodules, and low latency can be achieved when computing units in the computing submodules access memory units. Multiple computing submodules present a symmetric layer design, and such a symmetric layer structure facilitates the construction of a topology network so as to achieve large-scale or ultra-large-scale computation. The memory capacity of the memory units in each computing submodule can be customized, and designed flexibly. These computing submodules are in a bonding connection, and the data bit width after the bonding connection may be positive integer multiple of the data bit width of the computing units, so that high data bandwidth is achieved. The in-memory computing network (Continued)

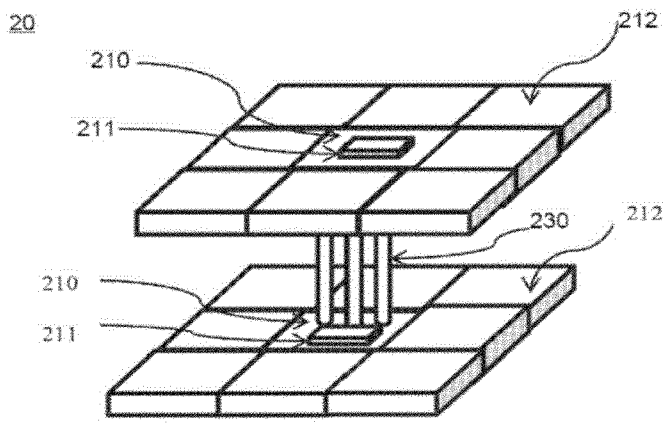

uses the in-memory computing module, so that the requirements for different scales of computation can be satisfied.

19 Claims, 6 Drawing Sheets

(56) References Cited

U.S. PATENT DOCUMENTS

2019/0319626 A1\* 10/2019 Dabral ............... H01L 25/0652
2019/0370269 A1   12/2019 Bogdan et al.

FOREIGN PATENT DOCUMENTS

| CN | 105468569 A | 8/2019 |
| CN | 110192269 A | 8/2019 |

OTHER PUBLICATIONS

He, Huaxin, "Research on Dynamic Resources Sharing in Three Dimensional Processors," Jan. 31, 2015, ISSN: 1674-0248, pp. 19-24.
May 8, 2021, International Search Report for International Application No. PCT/CN2021/073751.

\* cited by examiner